P. E. NEWCOMB.
WHEELBARROW.
APPLICATION FILED JAN. 24, 1910.
974,909.
Patented Nov. 8, 1910.
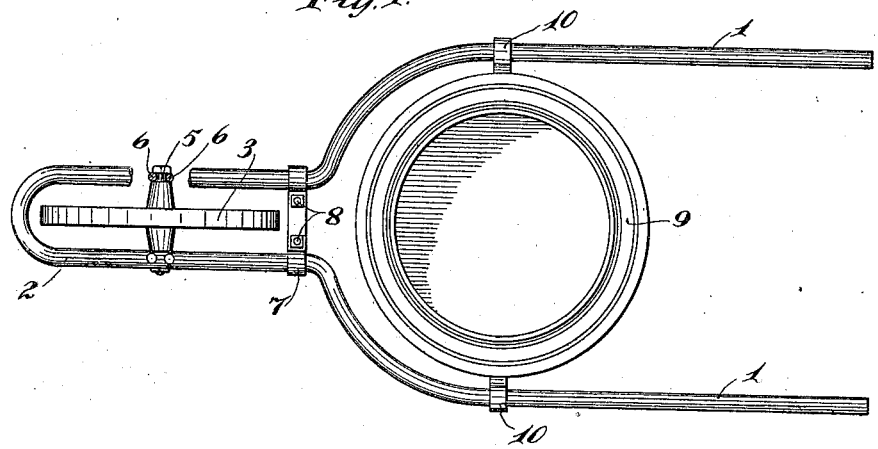
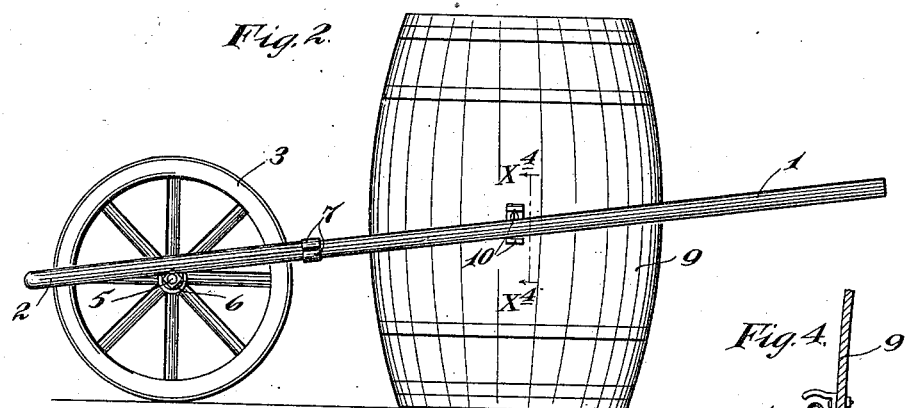
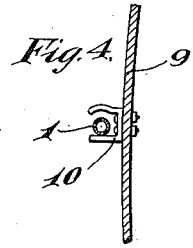
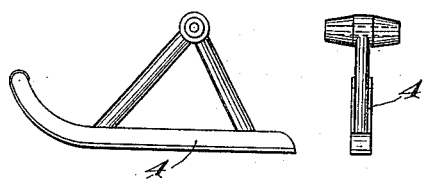
Witnesses:
W. H. Souba,
A. H. Opsahl.
Inventor:
Perl E. Newcomb,
By his Attorneys,
Williamson & Merchant

UNITED STATES PATENT OFFICE.

PERL E. NEWCOMB, OF HUTCHINSON, MINNESOTA.

WHEELBARROW.

974,909.  Specification of Letters Patent.  Patented Nov. 8, 1910.

Application filed January 24, 1910. Serial No. 539,696.

*To all whom it may concern:*

Be it known that I, PERL E. NEWCOMB, a citizen of the United States, residing at Hutchinson, in the county of McLeod and State of Minnesota, have invented certain new and useful Improvements in Wheelbarrows; and I do hereby declare the following to be a full, clear, and exact description of the invention, such as will enable others skilled in the art to which it appertains to make and use the same.

My invention has for its object to provide an improved wheelbarrow, and to this end, the invention consists of the novel devices and combinations of devices hereinafter described and defined in the claim.

The invention is illustrated in the accompanying drawings, wherein like characters indicate like parts throughout the several views.

Referring to the drawings, Figure 1 is a plan view of the improved wheelbarrow, with some parts broken away and with other parts sectioned; Fig. 2 is a side elevation of the same; Fig. 3 is a side elevation of the wheel yoke and a portion of one of the handle bars; Fig. 4 is a view, partly in section on the line $x^4$ $x^4$ of Fig. 2 and partly in full lines showing one of the coupling brackets; Fig. 5 is a side elevation of a runner attachment; and Fig. 6 is a rear end elevation of the same.

The numeral 1 indicates a pair of parallel and laterally spaced handle bars, preferably formed, as shown, from a single piece of metal pipe with the intermediate portion thereof brought quite close together to form a wheel yoke 2. Within the yoke 2, a wheel 3 or runner 4 is detachably mounted on a trunnion 5 in the form of a bolt, and which trunnion, in turn, is mounted in suitable bearings 6 secured to the under side of the yoke 2. The two sides of the yoke 2, at the rear of the wheel 3, are connected by a two-part tie bar 7 adapted to be clamped upon the yoke 2 by means of nutted bolts 8.

Pivotally and detachably mounted upon the handle bars 2 is a gravity arighted receptacle 9, preferably in the form of a barrel, but which may be of any desired shape or construction. For detachably and pivotally connecting the barrel 9 to the handle bars 2, a pair of coupling brackets 10 are rigidly secured, one to each side of the barrel. Each coupling bracket 10 is formed with a pair of outwardly projecting and vertically spaced prongs adapted to embrace the handle bars 2. The upper prongs of the brackets 10 are adapted to rest upon the handle bars 2 and pivotally support the barrel 9 in an elevated position when the handle bars 2 are raised. The lower prongs of the brackets 10 are adapted to support the handle bars 2 in their normal position when the barrel is resting upon a support. As is evident, any number of barrels 9 may be provided and the handle bars 2 applied to or removed from any one thereof by an endwise movement of the handle bars 2 through the coupling brackets 10.

The above device, while very simple in construction and of small cost, has, in actual usage, proven to be highly efficient for the purposes had in view. The device is especially adapted for use on a farm where it is necessary to carry water to several different places thereon, and by making the wheel 3 and the runner 4 interchangeable, the device may be used the year around.

What I claim is:

In a device of the kind described, the combination with a pair of laterally spaced handle bars constructed of a single piece of metal and the intermediate portion thereof being brought together to form a wheel yoke, a wheel mounted in said wheel yoke, and a barrel having laterally and oppositely projecting U-shape coupling brackets adapted to slide upon and embrace the said handle bars, the upper members of said brackets adapted to support the said barrel in an elevated position and the lower members of said brackets adapted to support said handle bars when said barrel is resting on a support, substantially as described.

In testimony whereof I affix my signature in presence of two witnesses.

PERL E. NEWCOMB.

Witnesses:
  MARIE E. LA PALME,
  HARRY D. KILGORE.